(12) United States Patent
Xu et al.

(10) Patent No.: US 12,481,426 B2
(45) Date of Patent: Nov. 25, 2025

(54) OPTIMIZING DATA RELIABILITY USING ERASE RETENTION

(71) Applicant: Micron Technology, Inc., Boise, ID (US)

(72) Inventors: Zhongguang Xu, San Jose, CA (US); Ronit Roneel Prakash, Hiratsuka (JP); Murong Lang, San Jose, CA (US); Ching-Huang Lu, Fremont, CA (US); Zhenming Zhou, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 10 days.

(21) Appl. No.: 18/514,926

(22) Filed: Nov. 20, 2023

(65) Prior Publication Data
US 2024/0176496 A1    May 30, 2024

Related U.S. Application Data

(60) Provisional application No. 63/385,510, filed on Nov. 30, 2022.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| 2008/0098192 A1* | 4/2008 | Im | G06F 12/0246 711/170 |
| 2010/0174845 A1* | 7/2010 | Gorobets | G06F 12/0246 711/E12.001 |
| 2011/0029715 A1* | 2/2011 | Hu | G06F 12/0246 711/170 |
| 2014/0244912 A1* | 8/2014 | Birk | G06F 12/0246 711/103 |
| 2015/0026386 A1* | 1/2015 | Wakchaure | G11C 16/102 711/103 |
| 2022/0318157 A1* | 10/2022 | Hsu | G06F 3/0604 |

OTHER PUBLICATIONS

McEwan, Alistair A., and Muhammad Ziya Komsul. "A real-time dependable flash storage system." IEEE Access 7 (2019): 142974-142990. (Year: 2019).*

* cited by examiner

*Primary Examiner* — Nicholas J Simonetti
(74) *Attorney, Agent, or Firm* — NICHOLSON DE VOS WEBSTER & ELLIOTT LLP

(57) ABSTRACT

Methods, systems, and apparatuses include moving a portion of memory to a garbage pool in response to determining that the portion of memory is invalid. The portion of memory is erased in response to determining that the portion of memory is invalid. A request to move an additional portion of memory to a free pool from the garbage pool is received. A free pool includes a queue including erased portions of memory, which serve as next portions of memory to fulfill subsequent cursor requests. The erased portion of memory is moved from the garbage pool to the free pool.

20 Claims, 6 Drawing Sheets

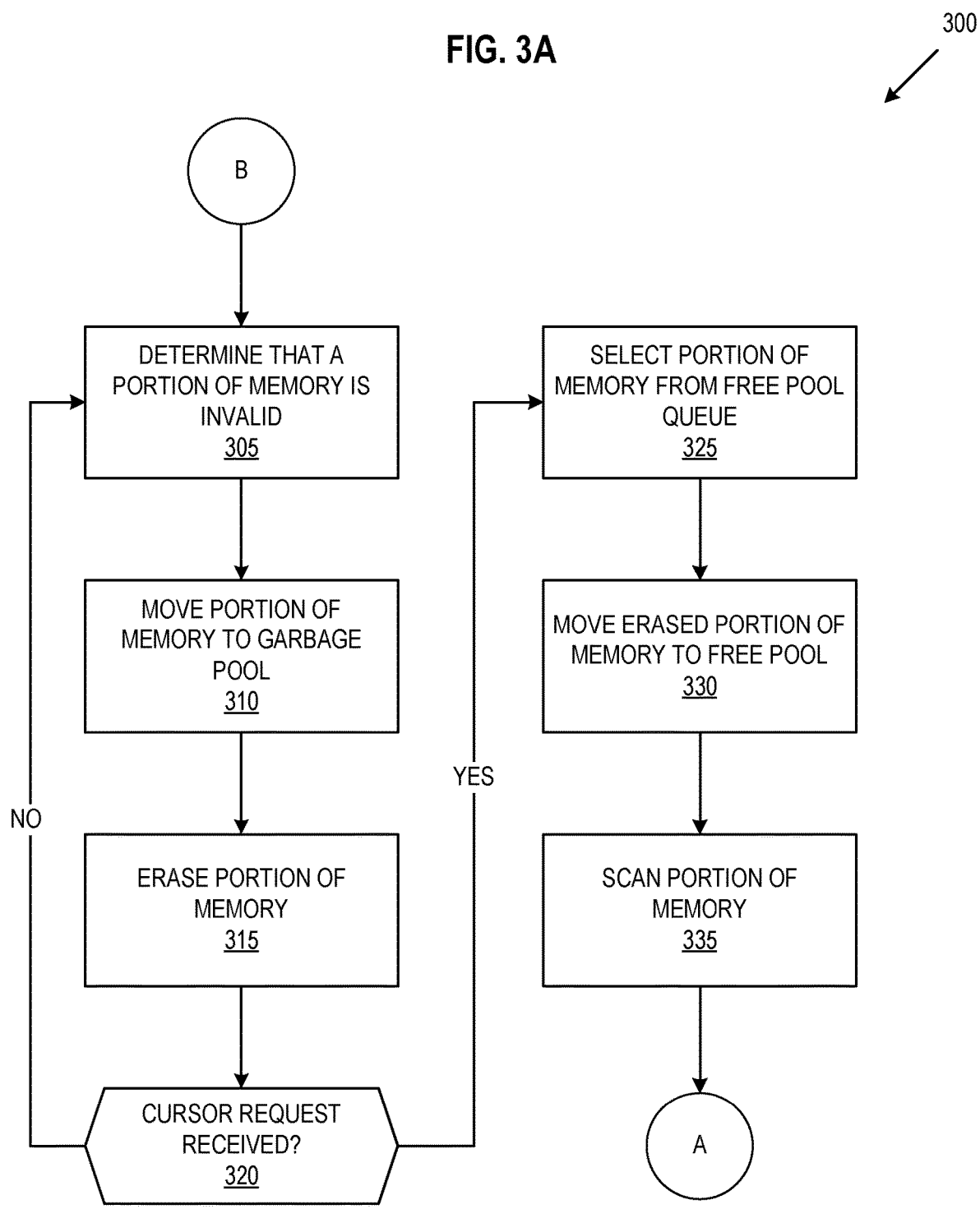

OPTIMIZING DATA RELIABILITY USING ERASE RETENTION

CROSS-REFERENCE TO RELATED APPLICATION

The present application claims the benefit of U.S. Provisional Patent Application No. 63/385,510, filed on Nov. 30, 2022, which is hereby incorporated by reference.

TECHNICAL FIELD

The present disclosure generally relates to optimizing data reliability, and more specifically, relates to optimizing data reliability using erase retention.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A and 3B are flow diagrams of an example method to optimize data reliability using erase retention in accordance with some embodiments of the present disclosure.

DETAILED DESCRIPTION

Figure 1:
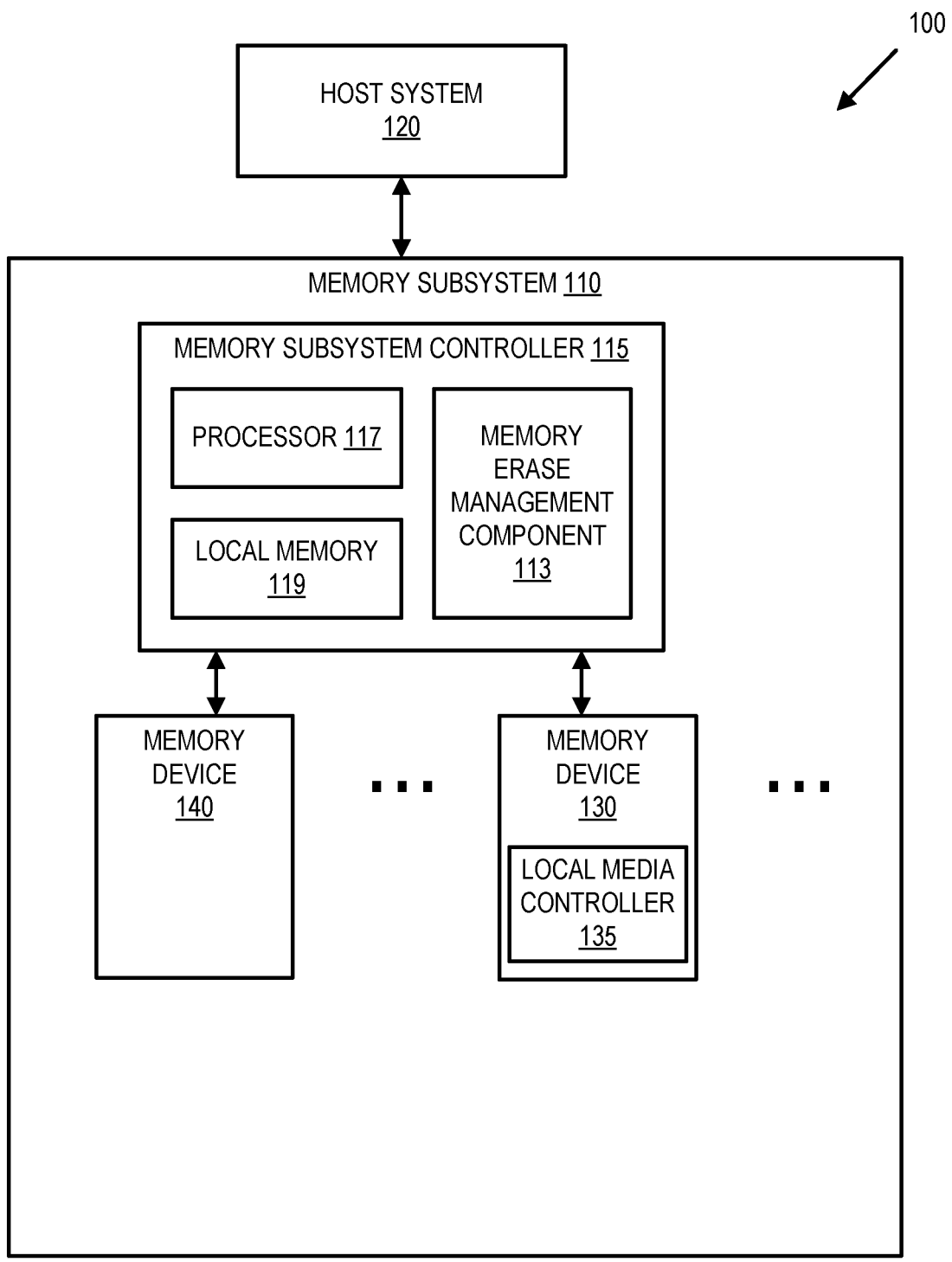
FIG. 1 illustrates an example computing system that includes a memory subsystem in accordance with some embodiments of the present disclosure.

Aspects of the present disclosure are directed to optimizing data reliability using erase retention. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), quad-level cells (QLCs), and penta-level cells (PLCs). For example, an SLC can store one bit of information and has two logic states.

The logic states in memory cells are differentiated using charge distribution levels. For example, a QLC can be capable of storing sixteen different charge levels, L0 through L8 to represent sixteen different binary values, 0000 through 1111. The data charge level becomes a threshold voltage, such that, when a read reference voltage is applied to a transistor for the memory cell, the transistor will turn on when the read reference voltage is higher than the threshold voltage. Charge gain, also referred to as charge distribution growth and charge migration, is a change in the threshold voltage that can result in a loss in reliability of the state of memory cells. In particular, L0 charge gain for a memory cell in an erased state (e.g., a QLC with a threshold voltage corresponding to storing a binary value of "1111") due to electron injection or hole de-trapping in/from the storage nitride layer can lead to the memory cell appearing to be in a non-erased state (e.g., a threshold voltage corresponding to storing a binary value of "1110").

Advancements in memory cell design (e.g., from floating-gate architecture to replacement-gate architecture) yield improvements, such as improved storage density, write endurance, and latency but have also brought about a greater sensitivity to charge gain. For example, the onset of L0 charge gain can start seconds after erasing a replacement-gate memory cell, compared to a few hours in a floating-gate memory cell. An erased block of memory can become unreliable if not programmed within, e.g., an hour of erasure. As a result of this greater sensitivity to charge gain, conventional memory subsystems avoid the erasure of memory blocks in advance of a write cursor demand for additional memory blocks. For example, erase on demand (EOD) is one technique of avoiding an erased block becoming unreliable due to not being programmed within a threshold period. This scheme will not erase a block until the memory subsystem receives a request to program data to the block. As a result, the time gap between erasure and programming of this block will be small and the block does not suffer from unreliability due to L0 charge gain. EOD, however, can slow system performance because each block's programming time will include the erase time. In an exemplary memory architecture, nearly ten percent of the time it takes to program a page of memory is attributed to block erase time. Additionally, memory elements exhibit reduced read window budget (RWB) as a result of being programmed immediately after erasure. Conventional systems address the reliability problem of charge gain but do not account for other aspects of data reliability, such as RWB.

Aspects of the present disclosure address the above and other deficiencies by erasing memory upon being invalidated and performing charge gain checks to ensure data reliability in a memory subsystem. For example, the memory subsystem can immediately erase data determined to be invalid upon the data entering the garbage pool. The memory subsystem can scan memory as it enters a free block pool to check for any problematic charge gain and correct any charge gain problems through a shallow erase operation. As a result of erasing the memory upon invalidation, the memory subsystem has an improved sequential write throughput while preventing the problems of charge gain through charge gain checks and corrections (e.g., additional erase operations). Additionally, the erase retention (i.e., storing the memory in an erased state) for these blocks leads to a significantly higher read window budget (RWB) for certain cell types with deeper erase requirements (e.g., QLCs and PLCs).

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded)

logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110). In some embodiments, the portions of memory with the memory device identified by garbage pool 210 and free pool 220 are composed of memory elements with deep erase requirements, such as QLCs and PLCs.

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a memory erase management component 113 that can erase memory upon entering a garbage pool and maintain a free pool of memory. In some embodiments, the controller 115 includes at least a portion of the memory erase management component 113. For example, the controller 115 can include a processor 117 (processing device) configured to execute instructions stored in local memory 119 for performing the operations described herein. In some embodiments, a memory erase management component 113 is part of the host system 120, an application, or an operating system.

The memory erase management component 113 erases memory upon entering a garbage pool and maintains a free pool of memory by moving memory into the free pool from the garbage pool. For example, memory subsystem 110 invalidates portions of memory due to erasures, folding/garbage collection, etc., adding those portions of memory to the garbage pool. Additionally, memory subsystem 110 receives data from host system 120 to write to memory device 140. In some embodiments, memory subsystem 110 writes data to memory device 140 using a write cursor. The write cursor will write to a portion of memory (e.g., a block) until the write cursor fills the portion of memory. When the write cursor fills the portion of memory, memory erase management component 113 allocates a new portion of memory from the free pool and the write cursor continues writing data into the new portion of memory. Further details with regard to the operations of the memory erase management component 113 are described below.

Figure 2:
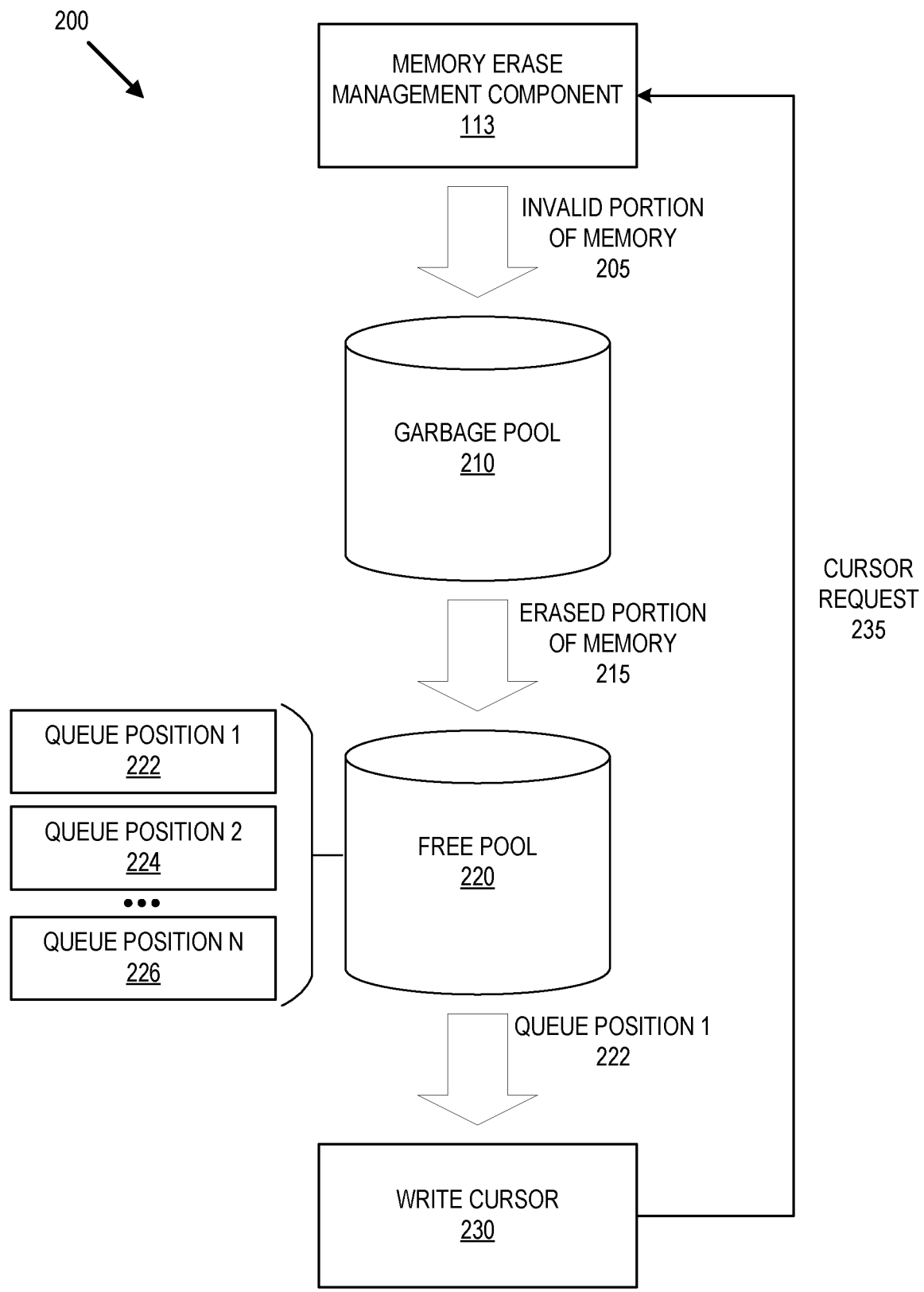
FIG. 2 illustrates an example system for optimizing data reliability using erase retention in accordance with some embodiments of the present disclosure.

FIG. 2 illustrates an example system 200 for optimizing data reliability using erase retention in accordance with some embodiments of the present disclosure. Exemplary system 200 includes memory erase management component 113, garbage pool 210, free pool 220, and write cursor 230. In some embodiments, memory erase management component 113 maintains garbage pool 210 and free pool 220 as data structures identifying portions of memory within a memory device, such as memory device 140 of FIG. 1. For example, memory erase management component 113 maintains garbage pool 210 and free pool 220 to determine the blocks or other portions of memory to allocate to write cursor 230. In some embodiments, the portions of memory with the memory device identified by garbage pool 210 and free pool 220 are composed of memory elements with deep erase requirements, such as QLCs and PLCs. For example, a "deep erase" refers to a higher erase voltage used to successfully erase a memory element, and a "shallow erase" refers to a lower erase voltage (i.e., relative to a deep erase) used to successfully erase a memory element.

In some embodiments, garbage pool 210 and free pool 220 are stored in local memory, such as local memory 119 of FIG. 1. In some embodiments, garbage pool 210 and free pool 220 are data structures used in a garbage collection process. For example, garbage pool 210 identifies invalidated and erased portions of memory and free pool 220 identifies erased and scanned portions of memory. Data in garbage pool 210 and free pool 220 refers to identifiers (e.g., pointers) for the corresponding portions of memory storing the data. Moving data between garbage pool 210 and free pool 220 therefore refers to moving an identifier for a corresponding portion of memory from garbage pool 210 to free pool 220.

Memory erase management component 113 manages the garbage collection process for a memory device, such as memory device 140 of FIG. 1. For example, memory erase management component 113 can determine portions of memory that are invalidated due to updating data, erasing data, folding data to a new location, etc. (e.g., invalid portion of memory 205) and move the portion of memory to garbage pool 210.

In response to moving invalid portion of memory 205 to garbage pool 210, memory erase management component 113 immediately executes an erase operation on invalid portion of memory 205. In some embodiments, memory erase management component 113 executes the erase operation within a threshold period of time after adding invalid portion of memory 205 to garbage pool 210. In some embodiments, the threshold time is predetermined based on system requirements (e.g., speed of processor and memory configuration). In some embodiments the threshold period of time is based on the queue length. For example, the threshold period of time is less than the amount of time it takes memory erase management component 113 to process the queue of free pool 220. In other embodiments, memory erase management component 113 determines the threshold period of time. For example, memory erase management component 113 determines the threshold period of time based on current workload, allowing more time if busy with other tasks. Garbage pool 210 therefore includes portions of memory determined to be invalid and subsequently erased. By erasing invalid portion of memory 205 upon entering garbage pool 210, instead of erasing invalid portion of memory 205 when needed for programming, invalid portion of memory 205 benefits from RWB gain from erase retention.

Free pool 220 includes a certain number (N) portions of memory including queue position 1 222, queue position 2 224, and queue position N 226. In some embodiments, the benefits of erase retention depend on the value of N. For example, the higher the value of N, the longer the erase retention and the lower the value of N, the shorter the erase retention. In some embodiments, the number N of portions of memory maintained in free pool 220 depends on the system requirements or application. For example, systems with higher RWB requirements will with a higher value of N and therefore a longer erase retention. As another example, systems with less tolerance for overprovisioning will have a lower value of N. In some embodiments, memory erase management component 113 determines the value of N by balancing overprovisioning requirements and RWB requirements.

Portions of memory in free pool 220 are arranged in a queue where queue position 1 222 is the first portion of memory to be provided to write cursor 230 and queue position N 226 is the last portion of memory to be provided to write cursor 230. In some embodiments, in response to allocating queue position 1 222 to write cursor 230, all queue positions in free pool 220 decrease by one. For example, queue position 2 224 becomes queue position 1 and queue position N 226 becomes queue position N–1. In some embodiments, queue position is based on when erased portion of memory 215 enters free pool 220. For example, erased portion of memory 215 enters free pool 220 most recently and is therefore placed in queue position N 226. In some embodiments, the queue position is based on program erase cycles or similar metric. For example, portions of memory with higher program erase cycles are kept in free pool 220 longer than portions of memory with lower program erase cycles. In such embodiments, memory erase management component 113 can balance the length of time the portions of memory have been in free pool 220 and the program erase cycle count for the portions of memory to determine the queue positions for the portions of memory.

In the illustrated example, memory erase management component 113 receives a cursor request 235 from write cursor 230. For example, in response to filling a portion of memory or in anticipation of filling a portion of memory, write cursor 230 sends cursor request 235 to memory erase management component 113. In response to receiving cursor request 235 from write cursor 230, memory erase management component 113 allocates the portion of memory in queue position 1 222 of free pool 220 to write cursor 230. In some embodiments, cursor request 235 is of a higher priority than a background write operation such that memory erase management component 113 allocated a portion of memory to write cursor 230 before the background write can continue.

When memory erase management component 113 moves a portion of memory from garbage pool 210 to free pool 220, memory erase management component 113 performs a scan operation on the portion of memory to detect charge gain for the portion of memory. For example, memory erase management component 113 moves erased portion of memory 215 from garbage pool 210 to free pool 220 and performs a NAND detect erased page (NDEP) scan. In some embodiments, memory erase management component 113 performs the scan operation before moving the portion of memory from garbage pool 210 to free pool 220. In some embodiments, memory erase management component 113 periodically performs a scan operation on portions of memory in free pool 220 (e.g., queue position 1 222 through queue position N 226). For example, memory erase management component 113 performs the scan operation on free pool 220 in predefined intervals. In some embodiments, the scan operation checks whether the portions of memory are fully erased. For example, all portions of memory in free pool 220 should have been erased prior to entering (e.g., upon entering garbage pool 210). Erase retention can lead to increased charge gain which can cause a portion of memory to no longer remain in an erased state sufficient for programming. In such cases, the results of the scan operation indicate that the portion of memory is not fully erased.

In some embodiments, in response to the scan operation detecting that the portion of memory is no longer fully erased, memory erase management component 113 performs a re-erase operation. For example, memory erase management component 113 performs a shallow erase operation on the portion of memory. For example, the re-erase operation is a shallow erase operation (e.g., an erase operation with a lower erase voltage than a typical/deep erase operation) without a pre-programming portion. In some embodiments, the re-erase operation uses a shorter erase duration than a usual erase operation. In some embodiments, memory erase management component 113 determines the erase voltage and erase duration based on system requirements. For example, memory erase management component 113 can vary the erase voltage and erase duration in order to optimize the success of the re-erase operation and the effect on the RWB of the portion of memory that is re-erased. By performing the re-erase operation, memory erase management component 113 is able to keep the RWB benefits from erase retention while reducing any harmful effects of charge gain.

Figure 3B:
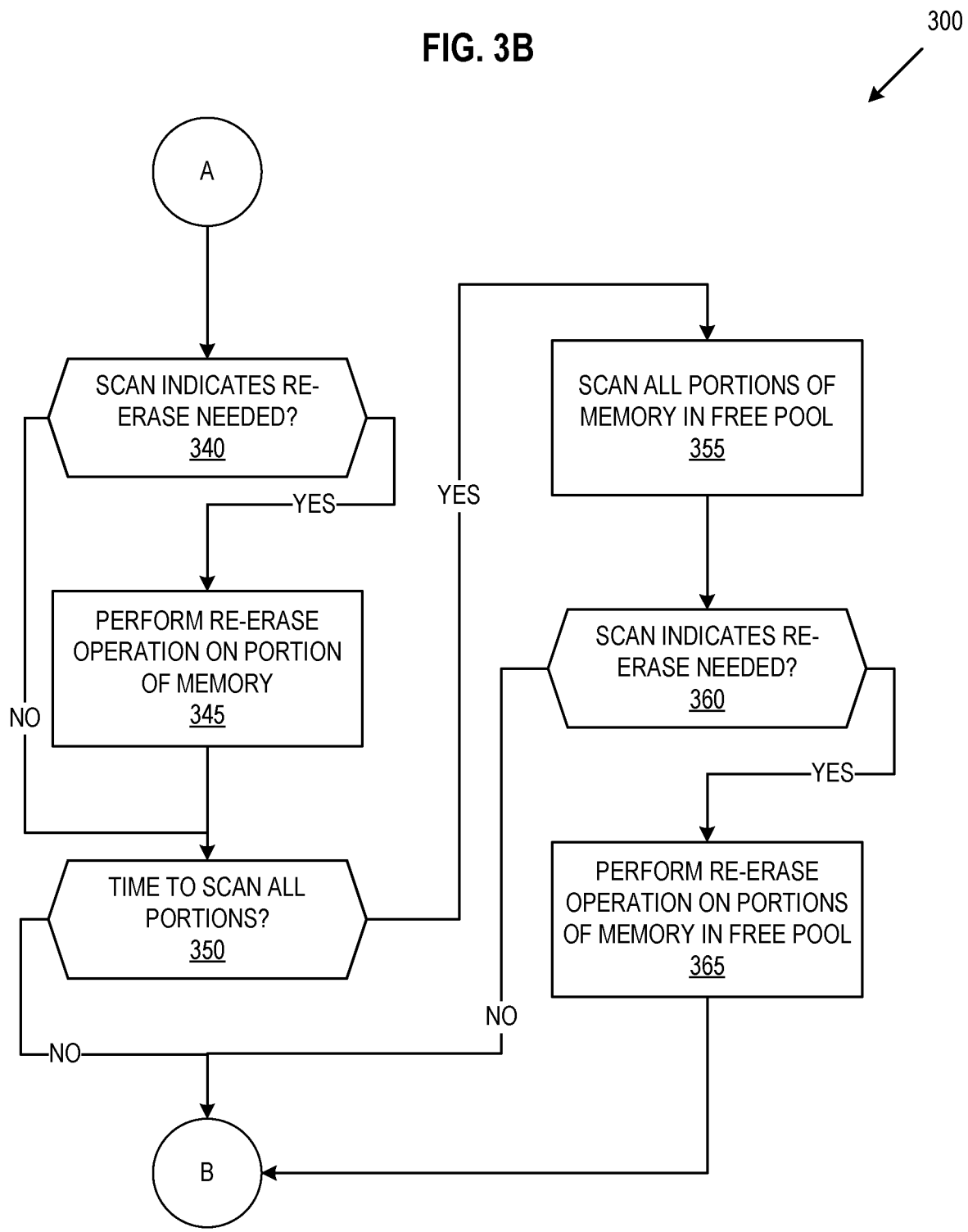

FIGS. 3A and 3B are flow diagrams of an example method 300 to optimize data reliability using erase retention, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the memory erase management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device determines that a portion of memory is invalid. For example, memory erase management component 113 determines that a block or other portion of memory in a memory device (such as memory device 140 of FIG. 1) has been invalidated (e.g., due to being invalidated in a garbage collection process).

At operation 310, the processing device moves the portion of memory to the garbage pool. For example, memory erase management component 113 moves the invalidated portion of memory (e.g., invalid portion of memory 205 of FIG. 2) to garbage pool (e.g., garbage pool 210 of FIG. 2). In some embodiments, the processing device maintains the garbage pool as a list or other data structure identifying invalid portions of memory.

At operation 315, the processing device erases the portion of memory. For example, memory erase management component 113 immediately performs an erase operation on the invalid portion of memory once the invalid portion of memory enters garbage pool. In some embodiments, the processing device performs the erase operation within a threshold period of time after adding the portion of memory to the garbage pool. In some embodiments, the threshold time is predetermined based on system requirements (e.g., speed of processor and memory configuration). In some embodiments the threshold period of time is based on the queue length. For example, the threshold period of time is less than the amount of time it takes the processing device to process a queue (such as the queue of free pool 220 of FIG. 2). In other embodiments, the processing device determines the threshold period of time. For example, memory erase management component 113 determines the threshold period of time based on current workload, allowing more time if busy with other tasks. In some embodiments, the processing device performs the erase operation immediately before the portion of memory enters the garbage pool.

At operation 320, the processing device determines whether a cursor request has been received. For example, memory erase management component 113 determines whether it has received a cursor request (e.g., cursor request 235 of FIG. 2) from a write cursor (e.g., write cursor 230). If the processing device receives a cursor request, the method 300 proceeds to operation 325. If the processing device does not receive a cursor request, the method 300 returns to operation 305.

At operation 325, the processing device selects a portion of memory from the free pool queue. For example, in response to receiving a cursor request, memory erase management component 113 selects a portion of memory from a free pool (e.g., free pool 220 of FIG. 2) to allocate to the write cursor in response to the cursor request.

In some embodiments, the free pool includes a certain number (N) portions of memory in a queue. Portions of memory in the free pool are arranged in a queue determining the order in which the portions of memory are provided to the write cursor (i.e., lowest queue position is the first portion of memory to be provided to the write cursor and high queue position is the last). In some embodiments, queue position is based on when the portion of memory enters the free pool. In some embodiments, the queue position is based on program erase cycles or similar age/usage metric. For example, portions of memory with higher program erase cycles are kept in free pool longer than portions of memory with lower program erase cycles. In such embodiments, the processing device can balance the length of time the portions of memory have been in the free pool and the program erase cycle count for the portions of memory to determine the queue positions for the portions of memory.

At operation 330, the processing device moves an erased portion of memory from the garbage pool to the erase pool. For example, memory erase management component 113 retrieves a portion of memory from the garbage pool that has already been erased and moves the erased portion of memory into the queue in the free pool. In some embodiments, the processes device retrieves a portion of memory that has been in the garbage pool for the longest amount of time. In some embodiments, the processing device retrieves a portion of memory based on program erase cycles or similar age/usage metric. For example, portions of memory with higher program erase cycles are kept in the garbage pool longer than portions of memory with lower program erase cycles. In such embodiments, the processing device retrieves a portion of memory based on the length of time the portions of memory have been in the free pool and the program erase cycle count for the portions of memory.

At operation 335, the processing device scans the portion of memory. For example, memory erase management component 113 performs a NAND detect erased page (NDEP) scan. In some embodiments, the processing device performs the scan operation before or in response to moving the portion of memory from the garbage pool to the free pool. In some embodiments, the scan operation checks whether the portions of memory are/remain fully erased.

At operation 340, the processing device determines whether the results of the scan indicate that a re-erase is needed. For example, memory erase management component 113 determines whether the NDEP indicated that the portion of memory is fully erased. If the portion of memory is not fully erased, memory erase management component 113 determines that the portion of memory needs to be re-erased. If the processing device determines that the results of the scan indicate that a re-erase is needed, the method 300 proceeds to operation 345. If the processing device determines that the results of the scan indicate that a re-erase is not needed, the method 300 proceeds to operation 350.

At operation 345, the processing device performs a re-erase operation on the portion of memory. For example, in response to the NDEP scan indicating that the portion of memory is not fully erased, memory erase management component 113 performs a shallow erase operation on the portion of memory. In some embodiments, the re-erase operation is an erase operation applied to erased portions of memory that need to be re-erased because of failing a scan operation (e.g., NDEP scan) due to charge gain. For example, the re-erase operation is a shallow erase operation (e.g., an erase operation with a lower erase voltage than a typical/deep erase operation) without a pre-programming portion. In some embodiments, the re-erase operation uses a shorter erase duration than a usual erase operation. In some embodiments, the processing device determines the erase voltage and erase duration based on system requirements. For example, memory erase management component 113 can vary the erase voltage and erase duration in order to optimize the success of the re-erase operation and the effect on the RWB of the portion of memory that is re-erased. By performing the re-erase operation, memory erase management component 113 is able to keep the RWB benefits from erase retention while reducing any harmful effects of charge gain.

At operation 350, the processing device determines whether it is time to scan all portions of memory in the free pool. For example, memory erase management component determines whether the time since a previous scan for the free pool satisfies a threshold scan time. In some embodiments, the threshold scan time is based on system requirements. For example, a system with stricter charge gain requirements has a lower scan time than a system with less strict charge gain requirements. If the processing device determines that it is time to scan all the portions of memory in the free pool, the method 300 proceeds to operation 355. If the processing device determines that it is not time to scan all the portions of memory in the free pool, the method 300 returns to operation 305 through off-page connector.

At operation 355, the processing device scans all the portions of memory in the free pool. For example, memory erase management component 113 performs a NAND detect erased page (NDEP) scan on all portions of memory in the free pool. In some embodiments, the scan operation checks whether the portions of memory in the free pool are fully erased.

At operation 360, the processing device determines whether the results of the scan indicate that a re-erase is needed. For example, memory erase management component 113 determines whether the NDEP indicated that all of the portions of memory in the free pool are fully erased. If a portion of memory in the free pool is not fully erased, memory erase management component 113 determines that that portion of memory needs to be re-erased. If the processing device determines that the results of the scan indicate that a re-erase is needed, the method 300 proceeds to operation 365. If the processing device determines that the results of the scan indicate that a re-erase is not needed, the method 300 returns to operation 305 through off-page connector.

At operation 365, the processing device performs a re-erase operation on portions of memory in the free pool. For example, in response to the NDEP scan indicating that a portion of memory in the free pool is not fully erased, memory erase management component 113 performs a shallow erase operation on the portion of memory.

Figure 4:
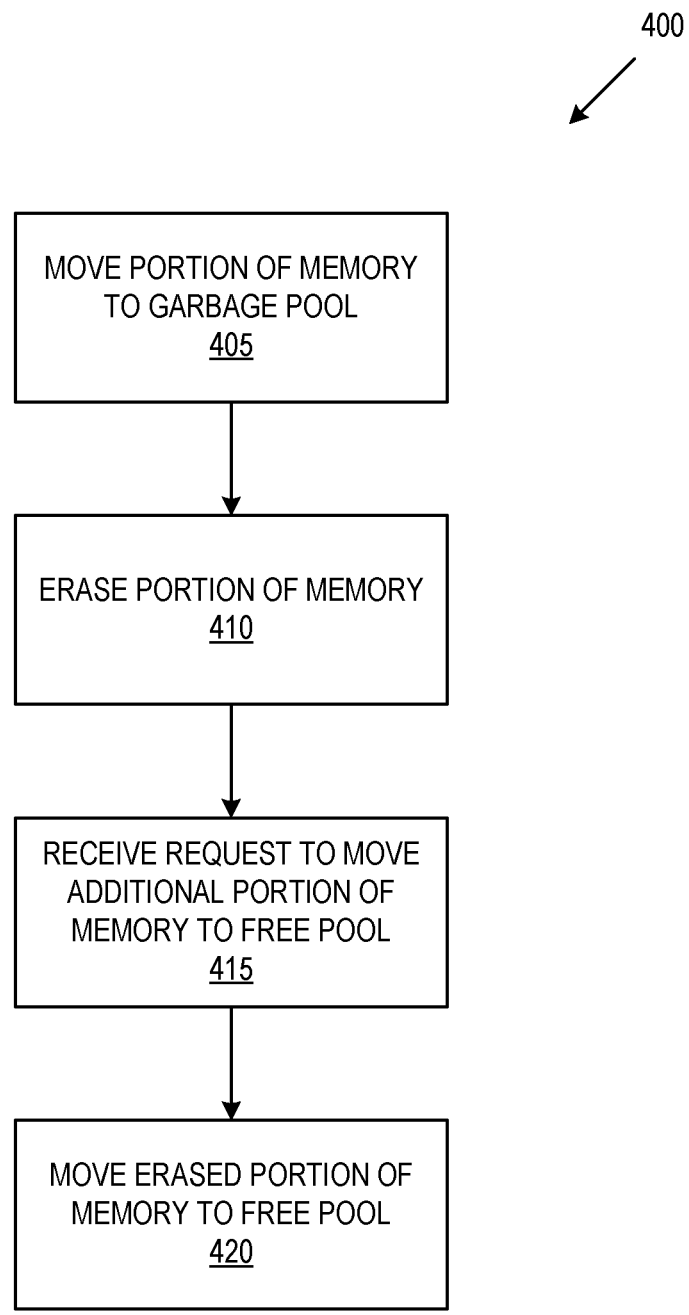
FIG. 4 is a flow diagram of another example method to optimize data reliability using erase retention in accordance with some embodiments of the present disclosure.

FIG. 4 is a flow diagram of an example method 400 to optimize data reliability using erase retention, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory erase management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device moves a portion of memory to the garbage pool in response to determining that the portion of memory is invalid. For example, memory erase management component 113 determines that a block or other portion of memory in a memory device (such as memory device 140 of FIG. 1) has been invalidated (e.g., due to being invalidated in a garbage collection process) and moves the invalidated portion of memory (e.g., invalid portion of memory 205 of FIG. 2) to garbage pool (e.g., garbage pool 210 of FIG. 2).

At operation 410, the processing device erases the portion of memory. For example, memory erase management component 113 immediately performs an erase operation on the invalid portion of memory once the invalid portion of memory enters garbage pool. In some embodiments, the processing device performs the erase operation within a threshold period of time after adding the portion of memory to the garbage pool. In some embodiments, the threshold time is predetermined based on system requirements (e.g., speed of processor and memory configuration). In some embodiments the threshold period of time is based on the queue length. For example, the threshold period of time is less than the amount of time it takes the processing device to process a queue (such as the queue of free pool 220 of FIG. 2). In other embodiments, the processing device determines the threshold period of time. For example, memory erase management component 113 determines the threshold period of time based on current workload, allowing more time if busy with other tasks. In some embodiments, the processing device performs the erase operation immediately before the portion of memory enters the garbage pool.

At operation 415, the processing device receives a request to move an additional portion of memory to the free pool. For example, memory erase management component 113 receives a cursor request (e.g., cursor request 235 of FIG. 2) from a write cursor (e.g., write cursor 230) requesting a portion of memory to be allocated.

In some embodiments, the free pool includes a certain number (N) portions of memory in a queue. Portions of memory in the free pool are arranged in a queue determining the order in which the portions of memory are provided to the write cursor (i.e., lowest queue position is the first portion of memory to be provided to the write cursor and high queue position is the last). In some embodiments, queue position is based on when the portion of memory enters the free pool. In some embodiments, the queue position is based on program erase cycles or similar metric. For example, portions of memory with higher program erase cycles are kept in free pool longer than portions of memory with lower program erase cycles. In such embodiments, the processing device can balance the length of time the portions of memory have been in the free pool and the program erase cycle count for the portions of memory to determine the queue positions for the portions of memory.

At operation 420, the processing device moves the erased portion of memory to the free pool. For example, memory erase management component 113 selects a portion of memory from a free pool (e.g., free pool 220 of FIG. 2) to allocate to the write cursor in response to the cursor request. Memory erase management component 113 then retrieves an erased portion of memory from the garbage pool and moves the erased portion of memory into the queue in the free pool. In some embodiments, the processes device retrieves a portion of memory that has been in the garbage pool for the longest amount of time. In some embodiments, the processing device retrieves a portion of memory based on program erase cycles or similar age/usage metric. For example, portions of memory with higher program erase cycles are kept in the garbage pool longer than portions of memory with lower program erase cycles. In such embodiments, the processing device retrieves a portion of memory based on the length of time the portions of memory have been in the free pool and the program erase cycle count for the portions of memory.

Figure 5:
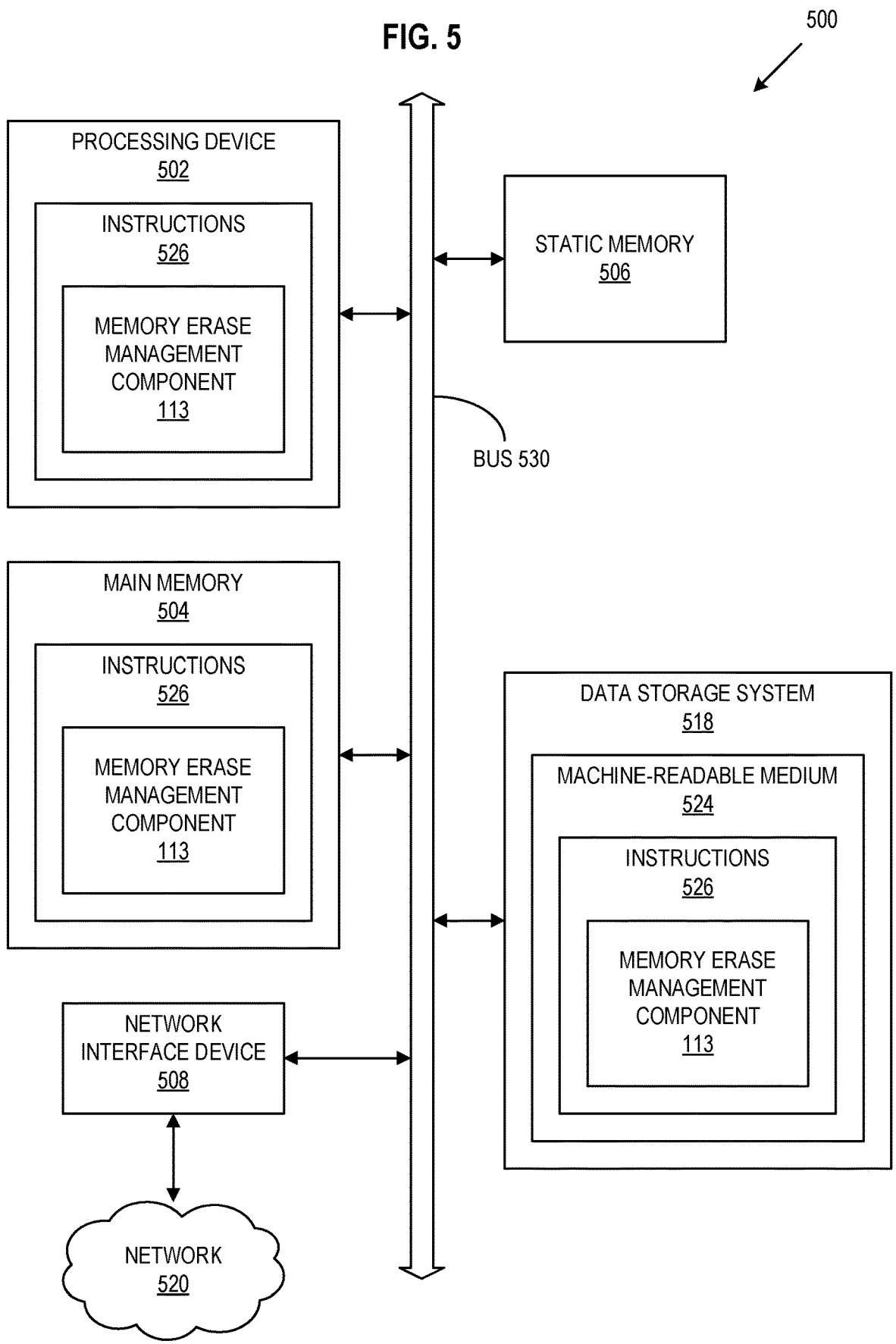
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the memory erase management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a memory erase management component (e.g., the memory erase management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining that a portion of memory is invalid;
   moving the portion of memory to a garbage pool in response to determining that the portion of memory is invalid;
   erasing the portion of memory in response to moving the portion of memory to the garbage pool;
   receiving a request to move an additional portion of memory to a free pool from the garbage pool, wherein the free pool includes a queue comprising a plurality of erased portions of memory, which serve as next portions of memory to fulfill subsequent cursor requests; and
   moving the erased portion of memory from the garbage pool to the free pool.

2. The method of claim 1, further comprising:
   receiving a cursor request;
   selecting a portion of memory from the queue to satisfy the cursor request; and
   requesting an additional portion of memory from the garbage pool.

3. The method of claim 2, wherein selecting the portion of memory from the queue is based on how long each of the plurality of erased portions of memory has been in the free pool.

4. The method of claim 2, wherein selecting the portion of memory from the queue is based on program erase cycles for each of the plurality of erased portions of memory.

5. The method of claim 1, further comprising:
   in response to moving the erased portion of memory, scanning the erased portion of memory; and
   performing a re-erase operation on the erased portion of memory based on a result of the scan.

6. The method of claim 5, wherein scanning the erased portion of memory comprises performing a detect erased page scan on the portion of memory and wherein the re-erase operation is a shallow erase operation performed if the detect erased page scan fails.

7. The method of claim 5, further comprising:
   periodically scanning the plurality of erased portions of memory in the queue; and
   performing the re-erase operation on the plurality of erased portions of memory based on the result of the scan.

8. A non-transitory computer-readable storage medium comprising instructions that, when executed by a processing device, cause the processing device to:
   move a portion of memory to a garbage pool in response to determining that the portion of memory is invalid;
   erase the portion of memory in response to determining that the portion of memory is invalid and in response to moving the portion of memory to the garbage pool;
   receive a request to move an additional portion of memory to a free pool from the garbage pool, wherein the free pool includes a queue comprising a plurality of erased portions of memory, which serve as next portions of memory to fulfill subsequent cursor requests; and
   move the erased portion of memory from the garbage pool to the free pool.

9. The non-transitory computer-readable storage medium of claim 8, wherein the processing device is further to:
   receive a cursor request;
   select a portion of memory from the queue to satisfy the cursor request; and
   request an additional portion of memory from the garbage pool.

10. The non-transitory computer-readable storage medium of claim 9, wherein selecting the portion of memory from the queue is based on how long each of the plurality of erased portions of memory has been in the free pool.

11. The non-transitory computer-readable storage medium of claim 9, wherein selecting the portion of memory from the queue is based on program erase cycles for each of the plurality of erased portions of memory.

12. The non-transitory computer-readable storage medium of claim 8, wherein the processing device is further to:
   in response to moving the erased portion of memory, scan the erased portion of memory; and
   perform a re-erase operation on the erased portion of memory based on a result of the scan.

13. The non-transitory computer-readable storage medium of claim 12, wherein scanning the erased portion of memory comprises performing a detect erased page scan on the portion of memory and wherein the re-erase operation is a shallow erase operation performed if the detect erased page scan fails.

14. The non-transitory computer-readable storage medium of claim 12, wherein the processing device is further to:

periodically scan the plurality of erased portions of memory in the queue; and perform the re-erase operation on the plurality of erased portions of memory based on the result of the scan.

15. A system comprising:

a plurality of memory devices; and a processing device, operatively coupled with the plurality of memory devices, to:

move a portion of memory to a garbage pool in response to determining that the portion of memory is invalid;

erase the portion of memory in response to determining that the portion of memory is invalid and in response to moving the portion of memory to a garbage pool;

receive a request to move an additional portion of memory to a free pool from the garbage pool, wherein the free pool includes a queue comprising a plurality of erased portions of memory, which serve as next portions of memory to fulfill subsequent cursor requests;

move the erased portion of memory from the garbage pool to the free pool;

in response to moving the erased portion of memory, scan the erased portion of memory; and perform a re-erase operation on the erased portion of memory based on a result of the scan.

16. The system of claim 15, wherein the processing device is further to:

receive a cursor request;

select a portion of memory from the queue to satisfy the cursor request; and request an additional portion of memory from the garbage pool.

17. The system of claim 16, wherein selecting the portion of memory from the queue is based on how long each of the plurality of erased portions of memory has been in the free pool.

18. The system of claim 16, wherein selecting the portion of memory from the queue is based on program erase cycles for each of the plurality of erased portions of memory.

19. The system of claim 15, wherein the processing device is further to:

in response to moving the erased portion of memory, scan the erased portion of memory; and perform a re-erase operation on the erased portion of memory based on a result of the scan.

20. The system of claim 19, wherein scanning the erased portion of memory comprises performing a detect erased page scan on the portion of memory and wherein the re-erase operation is a shallow erase operation performed if the detect erased page scan fails.

* * * * *